Feb. 3, 1931.  W. MAIER  1,790,937
CUTTING MECHANISM
Original Filed July 3, 1924   7 Sheets-Sheet 1

Fig. 1.

Inventor:
William Maier,
By Hugh K. Wagner,
Attorney

Feb. 3, 1931.   W. MAIER   1,790,937
CUTTING MECHANISM
Original Filed July 3, 1924   7 Sheets-Sheet 2

Fig. 2.

Inventor:
William Maier,
By Hugh K. Wagner
Attorney.

Feb. 3, 1931.  W. MAIER  1,790,937
CUTTING MECHANISM
Original Filed July 3, 1924   7 Sheets-Sheet 5

Feb. 3, 1931.  W. MAIER  1,790,937
CUTTING MECHANISM
Original Filed July 3, 1924  7 Sheets-Sheet 7

Inventor:
William Maier,
By Hugh K. Wagner
Attorney.

Patented Feb. 3, 1931

1,790,937

UNITED STATES PATENT OFFICE

WILLIAM MAIER, OF ST. LOUIS, MISSOURI

CUTTING MECHANISM

Original application filed July 3, 1924, Serial No. 723,933. Divided and this application filed October 4, 1926. Serial No. 139,397.

This invention relates to conveyors, and more particularly to a conveyor provided with timing means that controls the rate or frequency at which articles are carried by the conveyor. This application is a division of applicant's pending application, Serial Number 723,933, filed July 3, 1924, for cutting machines, and in connection with which the conveyor is especially useful.

One of the objects of the present invention is to provide a conveyor having a timing mechanism that may be adjusted in relation thereto to cause articles to be delivered to the conveyor at a predetermined frequency, or to determine the size or spacing of the articles, or for other purposes.

Another object is to provide a timing mechanism having full flexibility of adjustment, whereby it may be adjusted to any one of an unlimited number of positions within its range of adjustment.

Another object is to provide a timing mechanism which may be set for a desired size within a minimum of time by any attendant possessing no more than ordinary skill.

Another object is to provide means whereby the frequency, size, or other quantity for which the timer is set will be indicated automatically, rendering unnecessary any calculations or measurements on the part of the attendant.

Other objects and advantages will appear in the course of the following description of a preferred embodiment of the invention, employed, for the purpose of illustration, in connection with the cutting machine hereinbefore referred to.

In the accompanying drawings forming part of this specification, in which like numbers of reference denote like parts wherever they occur.

The cutting machine is adapted to cut sheet material, such as metal cloth, or paper, and especially pasteboard, strawboard, container board, and the like. The cutting mechanism, the driving means therefore, and the clutch that transmits power from the driving means to the cutting mechanism will be briefly described. The bed 1 and the uprights or standards 2, 3, and 4 secured thereto constitute the framework supporting the said clutch and the cutting and the driving means. The standards 2 and 3 are provided with bearings 5 and 6, respectively, and standard 4, also, has a bearing (partly shown) wherein revolves drive shaft 7 having tight and loose pulleys 8 and 9 and spur pinion 10, which is keyed in fixed relation thereto. Spur pinion 10 drives spur gear 11, loosely mounted unattached on shaft 12, journaled in bearings 13, 14, and 15 in standards 2, 3, and 4, respectively.

Figure 4:
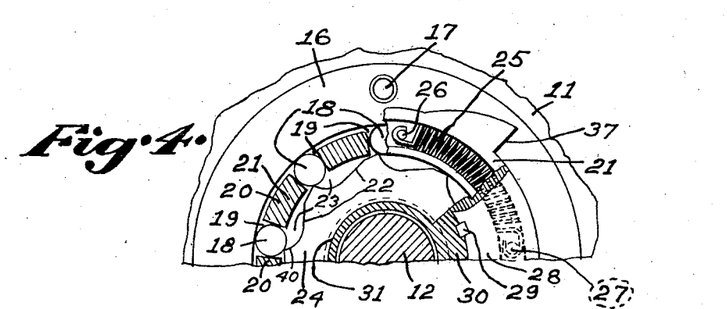
Figure 4 is an enlarged fragmentary detail view, partly in section, of the clutch mechanism.
Figure 5:
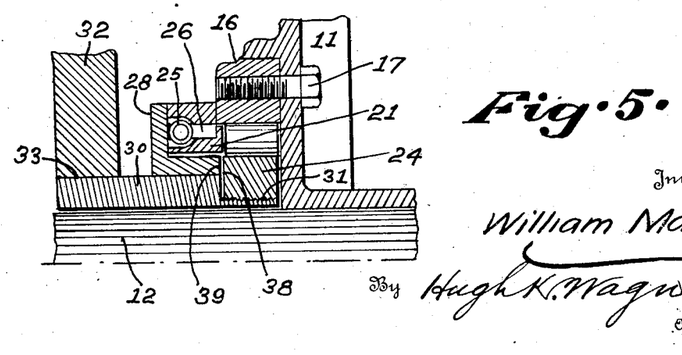
Figure 5 is a fragmental proximately vertical central sectional view of the same.

A ring 16 is fastened by screws 17 to gear 11, best shown in Figures 4 and 5. Rollers 18, located in notches 19 and between legs 20 in cage 21, are adapted to roll on the inclined edges 22 of the notches 23 in disc 24, which disc 24 is located within an opening through roller cage 21, adapted to hold the rollers 18 in notches 19. A tension spring 25 is attached by spring-post 26 to the cage 21, and by spring-post 27 to the clutch-disc 28. Clutch-disc 28 is fixed by a key 29 to sleeve 30, running loose unattached on shaft 12. Notched disc 24 is, also, internally threaded to fit the external thread 31 of sleeve 30. An eccentric gear 32 is sweated on the sleeve 30 at 33. A lever 34 pivoted at 35 normally has its end 36 in engagement with shoulder 37 of roller cage 21. Disengagement of the end 36 of lever 34 from shoulder 37 of cage 21 is accomplished by means forming part of the present invention, to be hereinafter described. Such disengagement releases cage 21, causing it to revolve under the tension of spring 25 in such direction that the rollers 18 travel each one up its adjacent incline 22 on the peripheral edge of disc 24 with the result that each roller is thus forced into contact with the inner periphery of ring 16, thereby producing a wedging effect that causes disc 24, ring 16, and roller cage 21 to travel as one, thereby rotating notched disc 24. On account of sleeve 30 and disc 24 being threaded left-handed, said disc 24 is screwed towards disc 28 until face 38 of disc 24 contacts with face 39 of disc 28. This action causes disc 28 and consequently sleeve 30 and eccentric gear 32 to rotate. When roller cage 21 has completed one revolution, it is brought to rest by the engagement of shoulder 37 with the end 36 of lever 34, brought into position against cage 21 by means hereinafter to be described. The consequent relative movement between notched disc 24 and rollers 18 through the intervention of roller cage 21 results in the rollers 18 moving down their respective inclines 22 against the upturned ends 40 of inclines 22 of notched disc 24, whereby said disc 24 is screwed away from disc 28, thereby releasing the clutch through the disengagement of faces 38 and 39 of discs 24 and 28, respectively.

Eccentric gear 32 drives eccentric gear 41, keyed to shaft 42, journaled in bearings in standards 2 and 3. Gear 43, fixed on the other end of shaft 42, drives gear 44, which in turn drives gear 45. Gears 44 and 45 drive cutter rolls 47 and 48, bearing co-operating helical knives 49 and 50, respectively. By virtue of the eccentric gears 32 and 41, knives 49 and 50 rotate fastest when cutting, and slower the rest of the time. A continuously acting brake 51 prevents back lash between the several gears and steadies the motion of the knives 49 and 50.

Figure 1:
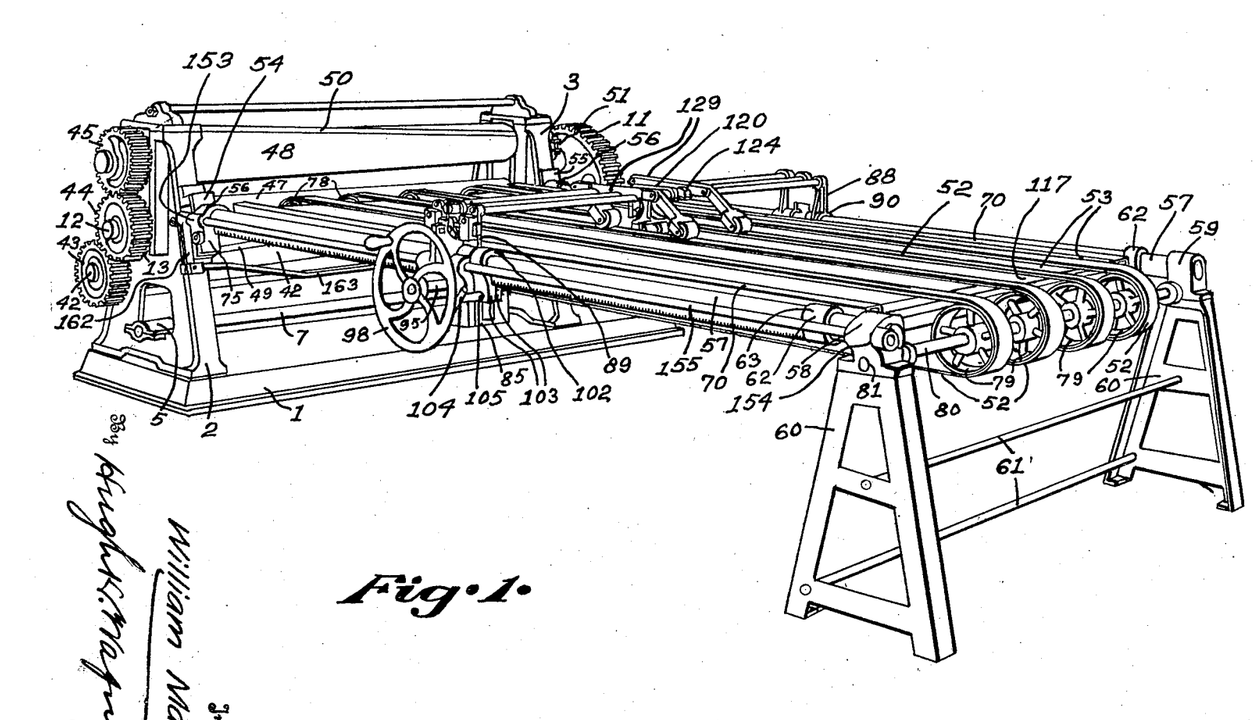
Figure 1 is a perspective view of the conveyor as used in the cutting machine.
Figure 2:
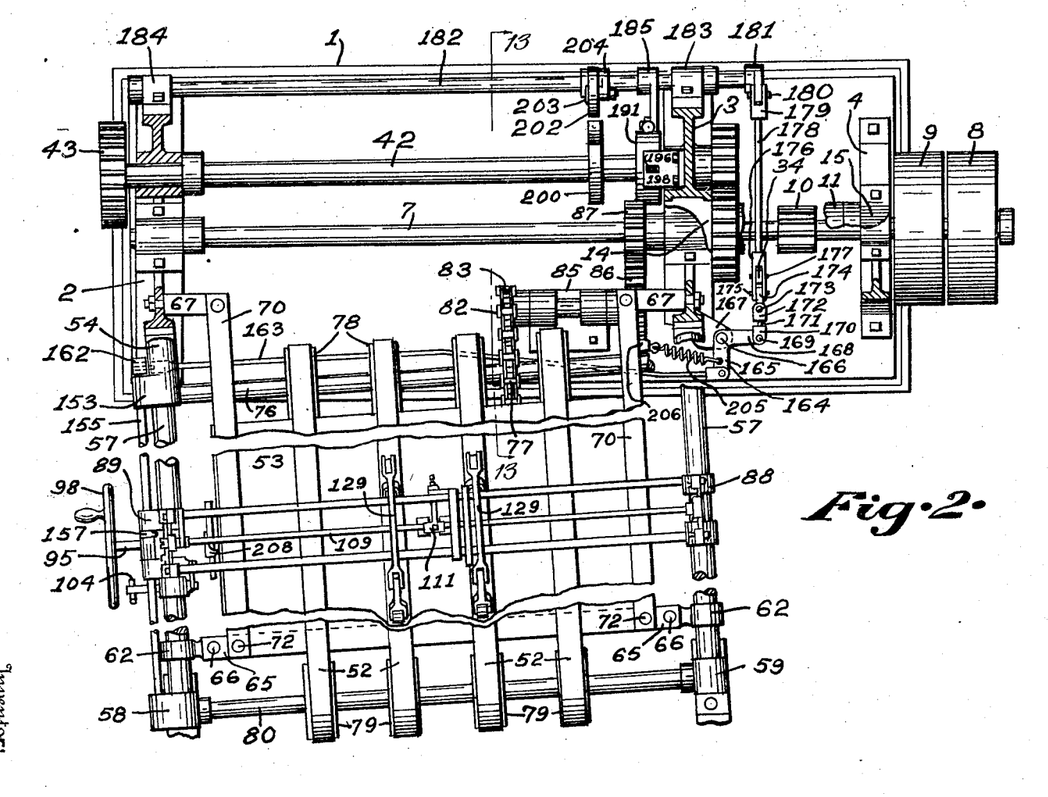
Figure 2 is a fragmentary and partly sectional plan view depicting in a comprehensive manner the co-operation of the various elements comprising the present invention.
Figure 3:
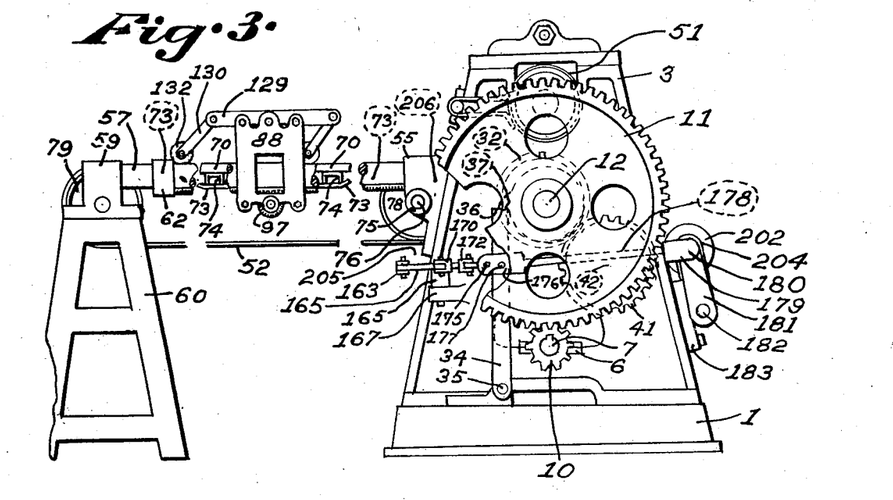
Figure 3 is a fragmentary elevation, showing that side of the machine not visible in Figure 1.

The pasting or double-face paper machine or receptacle containing a supply of material to be cut or stock of such material in any form, is not shown in the drawings, but it is to be understood that the said machine will be bolted to the rear or feed end of the machine depicted in Figure 1, or that end which is the far end and hidden from the observer as viewed in Figure 1. The said machine feeds the stock into the cutting rolls 47 and 48, at a speed equal to the peripheral speed of the cutting knives 49 and 50 at the time of their cutting the stock; and the several pieces are delivered from the cutting knives 49 and 50 at preferably double the said speed by conveyor belts 52, passing over conveyor table 53, at the front end of the cutting mechanism. On account of the helical arrangement of the knives 49 and 50, the stock can not be fed perpendicularly through the rolls 47 and 48, but must be fed at a compensating angle to the perpendicular in order to make a square cut, and the table 53 and belts 52 are, therefore, arranged slightly slanting relatively to the bed 1 and its associated standards 2 and 3, as best shown in Figure 2.

Figure 14:
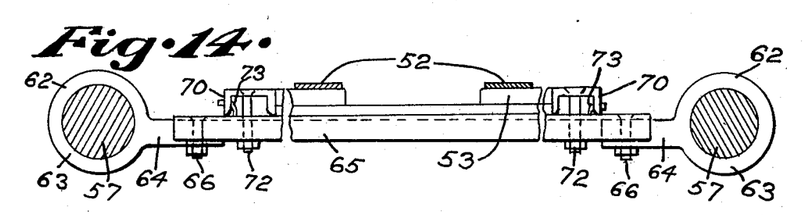
Figure 14 is a transverse sectional view through the delivery end of the conveyor, showing the manner of supporting the conveyor table.
Figure 15:
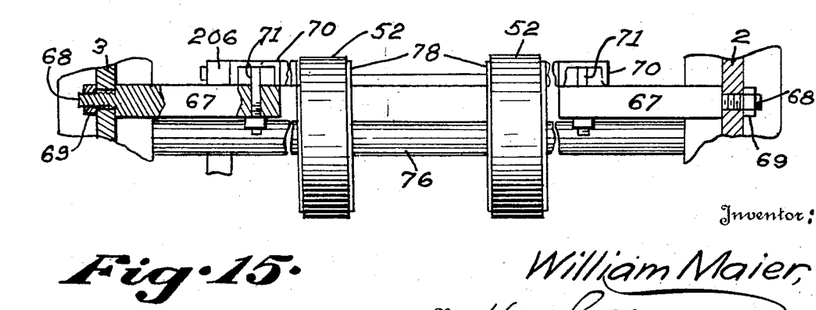
Figure 15 is a similar view through the receiving end of the conveyor.

Blocks 54 and 55, secured to standards 2 and 3, present sleeves 56, in which are fixed the far ends of rods 57, arranged parallel to and on either side of the table 53. The near or front ends of rods 57 are fixed in blocks 58 and 59, respectively, bolted or secured in any common manner to standards 60, secured oppositely to one another by tie rods 61. Brackets 62 are arranged just behind blocks 58 and 59; and comprise sleeves 63, whereby they are fixed to rods 57, and inwardly projecting horizontal arms 64, connected by a channel bar 65, supported thereon and secured thereto by suitable bolts 66, as best shown in Figure 14. Brackets 67 project horizontally from the inner sides of standards 2 and 3, from points behind the blocks 54 and 55 (see Figure 15), and have threaded stems 68, which extend through holes in standards 2 and 3 and are clamped thereto by nuts 69. Arranged along each side of the table 53 are channel beams 70, the rear ends of which are supported on and bolted at 71 to the brackets 67, and the front ends of which are supported on and bolted at 72 to the beam 65. Beams 70 are reinforced by trusses 73, passing under transverse beams 74, bolted to the underside of beams 70 and connecting them intermediately. Table 53, preferably of wood, is supported on and bolted to the transverse beams 65, 74, and 74.

Transverse bearings 75 are formed in blocks 54 and 55 under sleeves 56, and have journaled therein revoluble shaft 76, to which are fixed sprocket wheel 77 and pulleys 78, driving conveyor belts 52. At the front end of the conveyor, the belts 52 pass around pulleys 79, fixed to revoluble shaft 80, journaled in bearing 81 in blocks 58 and 59 under rods 57. Sprocket wheel 77 is driven through the intermediacy of sprocket chain 82, by sprocket wheel 83, fixed to counter-shaft 84, journaled in block 85, bolted to bed 1. (See Figure 13.) Shaft 84 has fixed thereto gear 86, meshing with gear 87, fixed to main drive shaft 7, whereby conveyor belts 52 are continuously driven through the intervention of the gearing just described.

The timing mechanism will now be described. An upright frame 88 at the far side of the machine, as viewed in Figure 1, and another upright frame 89 at the near side thereof, have pairs of horizontal sleeves 90, fitting slidably on the rods 57. The frames 88 and 89 are connected together at their upper corners by tie rods 91, secured by screws 92 passing through the respective frames and threading into the ends of the rods 91. The sleeves 90 are connected together at their lower ends by integral bridging portions 93, containing intermediately the bearings 94, in which is journaled the shaft 95. Rods 57 have secured to their under sides the toothed racks 96, meshing with pinions 97, fixed to the shaft 95 adjacent the bearings 94 of the respective frames 88 and 89. Shaft 95 projects outwardly beyond the frame 89, and has fixed to its projecting end a hand wheel 98. When the hand wheel 98 is turned, pinions 97 turn, also, and, by reason of their engagement with the stationary racks 96, cause frames 88 and 89 to move in unison along the rods 57. Lugs 99 project from the under side of sleeves 90, and are apertured for the reception of the screws 100, which thread into the ends of tie rods 101, which connect the lower portions of the frames 88 and 89. Frames 88 and 89, and rods 91 and 101 and their associated parts constitute the timer carriage. Adjacent one of the sleeves 90 of frame 89 is a split clamping sleeve 102 on the rod 57. Lugs 103 project from the opposing split ends of the ring, and may be drawn together and the sleeve tightened on the rod 57 by turning handle 104, the stem of which is reduced in diameter at a shoulder 105, abutting against outer lug 103, and the reduced portion of which stem is threaded into the inner lug 103. A strap 106 is secured by screws 107 and 108 to the inner sides of the sleeve 102 and its adjacent sleeve 90, respectively, whereby the sleeve 102 and frame 89 function as a single unit, their construction as two separate parts facilitating their manufacture.

Figure 11:
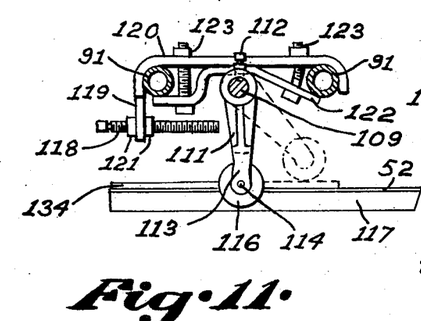
Figure 11 is a detail elevational view of the timer actuating roller and its support.
Figure 12:
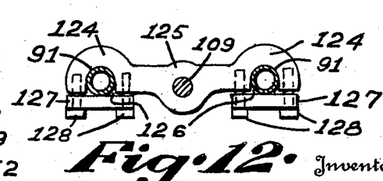
Figure 12 is a detail elevational view of the timer shaft bearing bracket.

A shaft 109 is journaled midway between and parallel to rods 91 in bearings 110, in the upper end of frames 88 and 89. A depending frame or target 111 is fixed to shaft 109 by set screw 112, the lower end of said frame being forked into a row of depending arms 113, which have aligned holes 114, in which is fixed cylindrical rod 115. Rollers 116 are adapted to turn freely on rods 115 between the arms 113. Rollers 116 are preferably formed hollow to reduce their weight. Rollers 116 swing in a recess or groove 117 in the table 53 between the two innermost belts 52. The backward swing of frame or target 111 is limited to a slight movement from the vertical by a set screw 118, held in a depending arm 119 of a bar 120, which passes over and partly around rods 91. Check nuts 121 retain screw 118 in place. Bar 120 is secured in place on the rods 91 by means of a clamping bar 122, which passes under rods 91 and over shaft 109, being drawn against rods 91 by bolts 123, passing through bars 120 and 122, as shown in Figure 11. Adjacent bar 120 on the rods 91 is a bracket 124, having an intermediate bearing 125 for the shaft 109. Rods 91 fit in grooves 126 in the underside of bracket 124, and are clamped thereto by caps or straps 127, caused to bear against the underside of rods 91 by screws 128, passing through caps 127 and threading into bracket 124.

Figure 10:
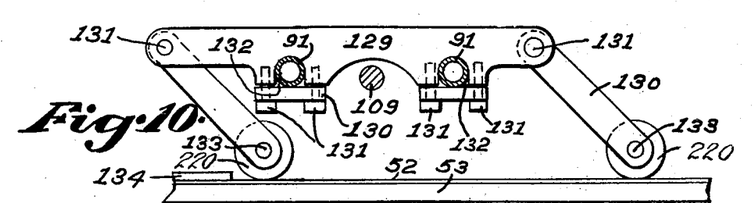
Figure 10 is a detail elevational view of a pair of timer traction rollers and the supporting frame therefor.

Brackets 129, best shown in Figure 10, are borne by the rods 91 directly over preferably the two innermost of the belts 52, being clamped to rods 91 in a manner similar to that in which bracket 124 is secured thereto, by means of caps 130 clamped by screws 131 against rods 91 in grooves 132. Bracket 129 projects some distance forward beyond front rod 91, and some distance to the rear of rear rod 91, the said projecting ends being bifurcated to straddle the sides of arms 130, pivoted thereto at 131, and slanting forwardly and downwardly, the lower ends of said arms being bifurcated to straddle rollers 220, turning on pins 133 passing through and fixed in the said bifurcated ends. Rollers 132 bear on the belts 52 and on the severed stock pieces 134 carried thereon, producing sufficient friction between the stock and the belts to insure that the stock will continue to move forward with the belts during its engagement with the roll 116, which roll and frame 111 is swung forward and upward when engaged by the front end of the stock 134, shown in dotted lines in Figure 11.

Figure 9:
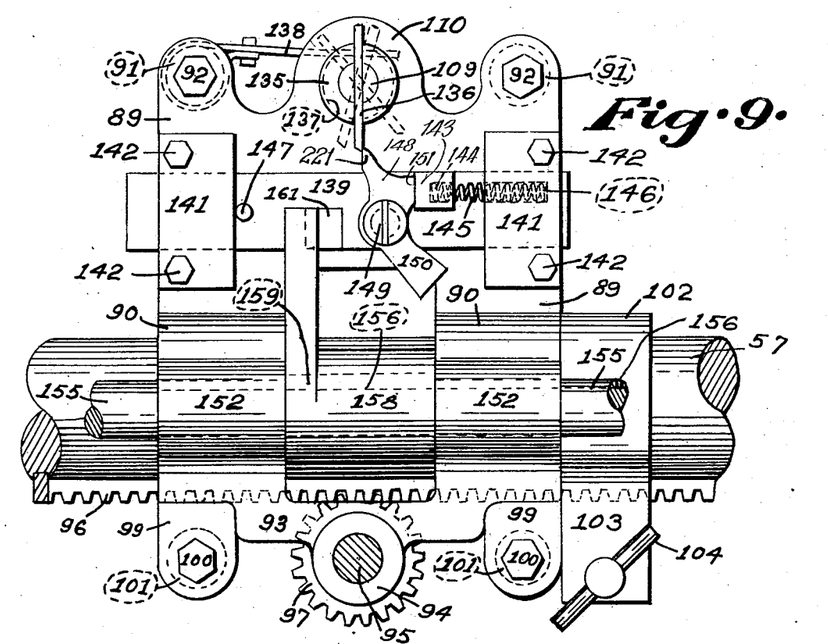
Figure 9 is an enlarged elevational view of the timer carriage tripper bearing frame as viewed from the outside of the machine.

The shaft 109 projects through the bearing 110, in frame 89; and the said projecting portion has fixed thereto a collar 135, which collar and shaft are slotted transversely through their coinciding end faces to receive a trigger or blade 136, which is preferably held therein in any common manner, but preferably by a drive fit. Blade 136 is in angular alinement about shaft 109 with frame 111, the blade 136 being vertical when frame 111 hangs in its normal vertical position. When the stock 134 has swung roller 116 to its extreme forward position, blade 136 will have been rotated counter clockwise as shown in dotted lines in Figure 9, and when the stock portion has passed beyond roller 116, the said roller drops by gravity and is carried by its momentum beyond the vertical in the opposite direction, until frame 111 abuts against screw 118, blade 136 being rotated clockwise therewith as shown in broken-and-dotted lines. A collar 137 fixed on shaft 109 behind boss 110, has a flattened top in its periphery against which rests blade spring 138, secured to one of the rods 91. Pressure of blade spring 138 on the flat portion of the collar periphery tends to retain collar 137, and with it the shaft 109 and its associated parts, in a predetermined position against rotation, so that frame 111 and blade 136 are quickly brought to rest in a vertical position without performing a series of oscillations after having been actuated.

A slide 139 is adapted to reciprocate horizontally under blade 136 in grooves 140, formed in the inner side of caps 141, secured under screws 92 to the frame 89 by screws 142. A block 143, integral with slide 139, projects laterally from the upper portion thereof to the right of the blade 136. The right end of block 143 is recessed as at 144, for the reception of one end of a compression spring 145, the other end of which bears in a recess 146 in the left end of right-hand cap 141. A pin 147, projecting laterally from slide 139, limits the movement of slide 139 toward the left under the impulsion of spring 145 upon reaching its abutting position against the right end of left-hand cap 141. A pawl 148 is pivoted about a stud 149, threaded laterally into the lower portion of the slide 139 immediately to the right of the blade 136. Pawl 148 has an upwardly projecting beak 221, which is engaged by the blade 136; and a downwardly slanting arm 150, the preponderating weight of which urges pawl 148 to clockwise rotation, limited by the abutment of pawl projection 151 against lug 143. When blade 136 is rotated counter-clockwise from the vertical position indicated in full lines to the dotted-line position, pawl 148 and slide 139 move as one toward the right until the lower end of blade 136 reaches a point in the inclined arcuate path it describes where it ascends out of engagement with the beak 149 of pawl 148, whereupon slide 139 returns to its initial position under the impulsion of spring 145. When the stock 134 has passed beyond the roller 116, roller 116 and consequently blade 136 are rotated clockwise to the broken-and-dotted-line positions, the lower end of blade 136 striking against beak 149 and rotating pawl 148 counter-clockwise until beak 149 and blade 136 move out of mutual engagement, when pawl 148 is released and returns to its initial position under the influence of the weight 150.

Sleeves 90 of frame 89 develop laterally toward the outside of the machine into bearings 152, alined parallel to sleeves 90. A bearing 153 is similarly formed on block 54 and a bearing 154 on block 58, which bearings are alined with bearings 152. A shaft 155 termed a power-controlling member, is journalled in the bearings 152, 152, 153, and 154; and the said shaft has a keyway 156 in its upper side extending from bearing 153 to bearing 154. An upwardly extending rocker arm 157 is slidably mounted on shaft 155 through its hub 158 between the bearings 152, the hub 158 having fixed therein a feather-key 159, which is slidable in keyway 156. The upper end of arm 157 bears on its inner side a roller 160, which is normally urged toward the slide 139 by means to be hereinafter described, but is restrained therefrom, when the slide is in its normal position, by a detent 161, projecting laterally from the slide towards the roller 160. When the slide 139 is moved toward the right by the means hereinbefore described, lug 161 clears roller 160, permitting arm 157 to rock toward the slide, with the consequent rotation of shaft 155.

The far end of shaft 155 projects beyond the bearing 153, and has fixed thereto a lever 162, to which is pivoted one end of rod 163, the other end of which is pivoted to an arm 164 of a bell-crank 165 pivoted at 166 to a lug 167 integral with frame 3. The bell-crank arm 168 is pivoted at 169 to a clevis 170, connected by screw rod 171 to clevis 172 of a universal coupling 173, the other member 174 of which is pivoted at 175 to link 176, which link is pivoted at 177 to upright rod 34, pivoted at 35 to the bed 1. The rear end of link 176 is tapped for the reception of one end of screw rod 178, the other end of which rod is threaded into clevis 179, pivoted at 180 to lever 181, fixed to shaft 182, journaled in bearing 183, bolted to the rear of frame 3, and in bearing 184, bolted to the rear of frame 2.

A lever 185 is fixed to shaft 182 in juxtaposition to the inner side of frame 3. Lever 185 is pivoted at 186 to link 187, pivoted at 188 to bell-crank 189, pivoted at 190 to one end of the brake band 191, and at 192 to one end of link 193, the other end of which is pivoted at 194 to the other end of brake band 191, best shown in Figure 13. Brake band 191 encircles brake drum 195, fixed to shaft 42. Band 191 is bent upward into a loop 196, which fits into an aperture 197, in bracket 198, bolted by screws 199 to the inner side of frame 3. Loop 196 prevents rotation of band 191 with drum 195.

A cam 200 is keyed at 201 to shaft 42, and is engaged by cam roller 202, turning on stud 203, bolted to the upper end of arm 204, fixed on shaft 182.

Figure 6:
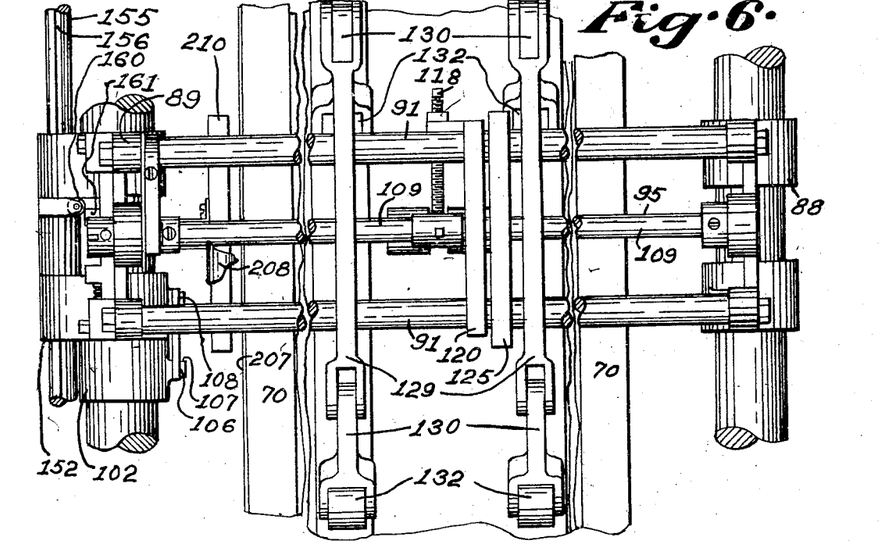
Figure 6 is an enlarged detail plan view of the timer and associated parts.
Figures 7, 8:
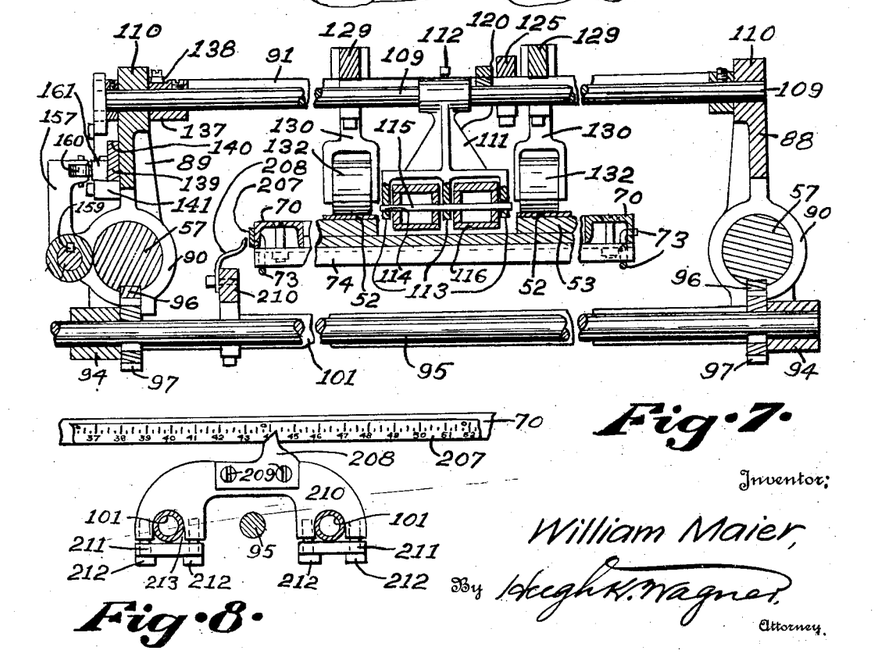
Figure 7 is a vertical transverse sectional view through the same.
Figure 8 is a detail view of the indicating device.
Figure 13:
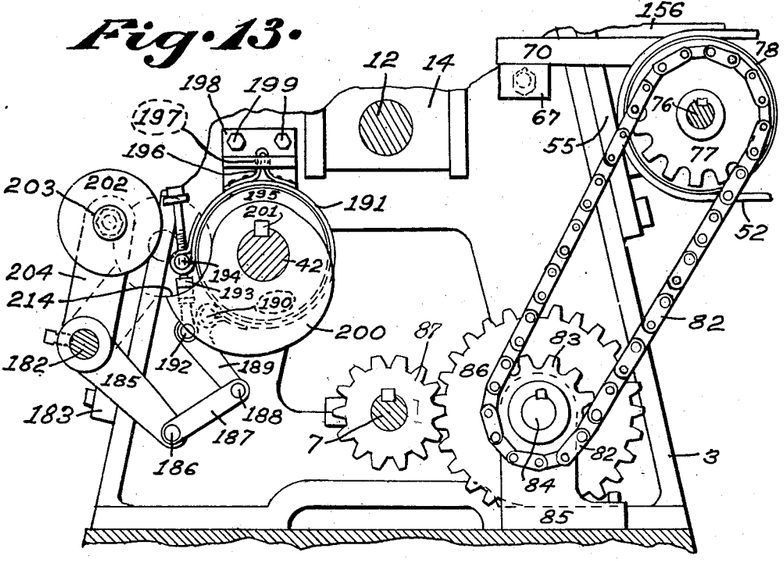
Figure 13 is a fragmentary enlargement view, taken on the line 13—13 of Figure 2, showing the brake, conveyor drive, and portions of the clutch controlling mechanism.

A retractile spring 205, having one end attached to arm 164 of bell-crank 165 and its other end attached to a post 206, depending from the table 53 and suitably attached thereto, normally urges, through the system of links, levers, and shafts just decribed, roller 202 towards the dotted position shown in Figure 13, tending at the same time to release brake band 191 from drum 195, to withdraw the end 36 of detent 34 from engagement with shoulder 37 of cage 21, and to urge roller 160 of arm 157 towards slide 139. When the knives are not being actuated, shaft 42 is stationary, and cam 200 fixed thereto, arm 204 and roller 202, occupy the positions indicated in full lines in Figure 13, the brake band 191, also, being set against the brake drum 195. Detent 34, also, abuts against shoulder 37 and prevents the clutch from seizing to start the cutting mechanism. The parts are retained in this position against the tendency of the spring 205 by reason of lug 161 obstructing the movement of roller 160 toward the slide 139, when the latter is in the normal position shown in Figures 6 and 9.

A graduated scale 207 is arranged along the outside of beam 70 (Figures 1, 6, 7, and 8), for the purpose of setting the timer to cause the actuation of the cutting mechanism at certain predetermined time intervals, whereby the length of the severed portions of stock may be regulated. Juxtaposed to scale 207 is a pointer 208, fastened by screws 209 to a bracket 210, secured to the rods 101 of the timer carriage, by means of caps 211, clamped by screws 212 against rods 101, received in grooves 213, in bracket 210. The numbers on the scale 207 are such that they indicate directly the length of the stock which will be produced when the pointer 208 of the timer carriage is set thereto.

The mode of operation of this machine will now be described. Handwheel 98 is rotated in the proper direction to cause the timer carriage to move along the rods 57 until pointer 208 is set to the number on the scale 207 which indicates the desired length of the stock pieces to be produced. The machine feeding the stock to the cutters, and the drive shaft 7, are started, the cutter rolls 47 and 48 remaining stationary until actuated by the timer. The stock passes between the rolls and on to the conveyor belts 52, and when the front end of the stock 134 reaches roller 116, the said roller and frame 111, constituting the target, are swung forwardly and upwardly, with the consequent rotation of blade 136 and the movement toward the right of slide 139, because of the engagement of blade 136 with the beak 149 of pawl 148. Slide 139 in its movement carries with it lug 161, whereby roller 160 is permitted to move toward the slide 139 under the impulsion of spring 205, rocking arm 157, shaft 155, and arm 162, and, through the various connections described, releasing brake 195, and withdrawing detent 36 from shoulder 37, causing the clutch to seize and start the cutting mechanism in the manner hereinbefore described. Cam roll 202 will, also, have moved to the dotted position indicated in Figure 13. Cutter rolls 47 and 48 continue to rotate until they have completed one revolution, when they are stopped automatically, as will presently appear. Shaft 42 completes one revolution in a counter-clockwise direction, as viewed in Figure 13, simultaneously with the rotation of the cutter rolls 47 and 48, carrying with it cam 200, which cam restores cam roll 202, arm 204, and shaft 182 to the initial position, shown in full lines, before it has completed its revolution. As the rotation continues, cam 200 leaves roll 202, by reason of the abrupt depression 214 in the contour thereof. The restoration of arm 204 to its initial position has resulted, through the system of connections of arm 204 with roller 160, in the recession of roller 160 from slide 139, permitting lug detent 161 to return to its initial position with slide 139 under the impulsion of spring 145. Detent 161 now again obstructs the movement of roller 160 towards slide 139 under the impulsion of spring 205, consequently preventing the return of arm 204 to the dotted position, permitted by the depression 214, as the cam 200 continues to rotate. The return of arm 204 to its normal full line position, it will be observed, has resulted in the simultaneous return of detent 34 to its initial position, so that it now again is in position to disengage the clutch upon the arrival of shoulder 37 of roller cage 21 at the detent end 36. It will, also, be observed that the return movement of arm 204 has been accompanied by the setting of the brake 195, so that the brake begins to act before the cutter rolls have completed their revolution, and thereby gradually check the momentum of the cutting mechanism so that the same may be brought to rest without undue wear on the rollers and inclines of the clutch.

Figure 16:
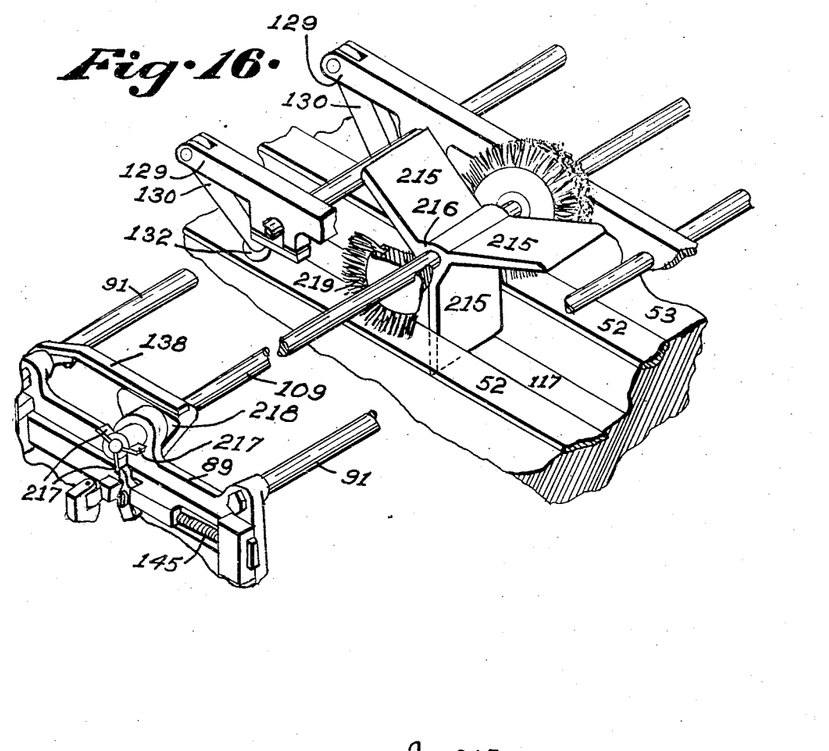
Figure 16 is a perspective view of an alternative form of timer.
Figure 17:
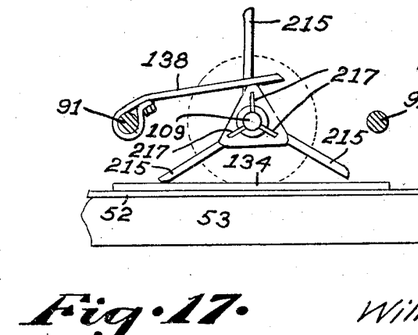
Figure 17 is a diagrammatic view showing the same in another position.

An alternative form of timer is exhibited by Figures 16 and 17. Herein, instead of the swinging frame 111 and roller 116, a plurality of vanes 215, in the present instance three, are mounted radially from a central hub 216, fixed to the shaft 109. The tripper-blade 136 is, also, replaced by three blades 217, alined radially to correspond with the arrangement of the vanes 215. Blades 217 and vanes 215 are held against undue oscillation, with the lowest vane vertical, in position to be actuated, by reason of spring blade 138 bearing against a face of equi-lateral-triangular shaped collar 218. Brush wheels 219 are fixed to shaft 109 and adapted to bear on the belts 52, but being held against rotation by reason of the pressure of blade spring 138 on a face of collar 218.

When the advancing forward end of the stock reaches the depending one of the vanes 215, the vanes are rotated, the depending blade 217 rotating therewith and moving slide 139 to the right, whereupon the cutting mechanism is started as heretofore set forth. The ascent of the depending vane in its forward rotation is accompanied by the descent of the vane following it, until both vanes lie upon or above the stock passing thereunder. When the severed stock has passed beyond the vanes, the rotation is continued by brush wheels 219, in frictional engagement with belts 52, free rotation of shaft 109 being now unrestrained because blade spring 138 rides on a high corner of collar 218. The rotation of vanes 215 continues until spring 138 again rests on a flat portion of collar 218, when the parts are in initial position preparatory to a repetition of the foregoing operation.

Having thus described this invention, I hereby reserve the benefit of all changes in form, arrangement, order, or use of parts, as it is evident that many minor changes may be made therein without departing from the spirit of this invention or the scope of the following claims.

I claim:

1. A timing mechanism comprising a carriage, a target shiftably borne thereby, a trigger borne by the said carriage and adapted to be operated by the target, a shiftable power-controlling member normally tending to move in one direction, and a detent located to obstruct the movement of the said member, but displaceable from its obstructing position by the said trigger.

2. A timing mechanism comprising a carriage, a target shiftably borne thereby, a trigger borne by the said carriage and adapted to be operated by said target, a shiftable power-controlling member normally impelled in one direction, a detent normally located to obstruct the movement of said member, but displaceable from its obstructing position by said trigger, means for restoring the detent to its normal position and means for returning said power-controlling member to its initial position.

3. A timing mechanism comprising a frame, a target pivoted thereto, a trigger movable with said target, a reciprocable member, spring-impelled towards its normal position, a pawl pivoted to the said member and engageable by said trigger, a block on the member for limiting the movement of said pawl in one direction, whereby the motion of said trigger in one direction is transmitted through said pawl and stop to the said member against the force of said spring, and a shiftable power-controlling member normally tending to move in one direction, but obstructed in such movement by said reciprocable member when the latter is in its normal position.

4. A timing mechanism comprising a frame, a depending target swinging therefrom, means for checking free oscillation of said target, a trigger movable with said target, a shiftable power-controlling member normally tending to move in one direction, and a detent located to obstruct the movement of said member, but displaceable from its obstructing position by said trigger.

5. A timing mechanism comprising a frame, a depending target swinging therefrom, a stop for limiting the return movement of said target, a trigger movable with said target, a shiftable power-controlling member normally tending to move in one direction and a detent located to obstruct the movement of said member, but displaceable from its obstructing position by said trigger.

6. A timing mechanism comprising a frame, a depending target swinging therefrom, a stop limiting the return movement of said target, means for checking free oscillation of said target, a trigger movable with said target, a shiftable power-controlling member normally tending to move in one direction and a detent located to obstruct the movement of said member, but displaceable from its obstructing position by said trigger.

7. A timing mechanism comprising a shiftable frame, a target pivoted thereto, a trigger movable with the said target, a shiftable power-controlling member normally tending to move in one direction, and means carried by the said frame for obstructing the movement of said member, but displaceable from its obstructing position by said trigger.

8. A timing mechanism comprising a frame, a depending target swinging therefrom, means for checking free oscillation of said target, a trigger movable with said target, a shiftable power-controlling member tending to move in one direction and shiftable means obstructing the movement of said member, but displaceable from its obstructing position by said trigger.

9. A timing mechanism comprising a shiftable frame, an oscillatory trigger, means for oscillating said trigger, a shiftable power-controlling member tending to move in one direction, and shiftable means carried by the said frame for obstructing the movement of said member, but displaceable from its obstructing position by said trigger.

10. The combination, with a carriage, of a timing mechanism comprising a shiftable power-controlling member normally tending to move in one direction, shiftable means borne by said carriage and adapted, when in its normal position, to obstruct the movement of said member and automatic means for shifting the obstructing means from its obstructing position.

11. The combination, with a carriage, of a timing mechanism comprising a shiftable power-controlling member normally tending to move in one direction, and shiftable means borne by said carriage and adapted to be normally urged into a position wherein it obstructs the movement of said member in said direction, but is displaceable therefrom to permit such movement, the said member after movement in such direction being adapted to obstruct the return of the shiftable means to its obstructing position.

12. The combination, with a carriage, of a timing mechanism comprising a shiftable power-controlling member normally tending to move in one direction, shiftable means borne by said carriage and adapted to be normally urged into a position wherein it obstructs the movement of the said member in said direction, but is displaceable therefrom to permit such movement, said member after movement in said direction being adapted to obstruct the return of the shiftable means to its obstructing position and means for automatically returning the power-controlling member to its non-obstructing position after it has remained in its obstructing position for a predetermined period.

13. The combination, with a carriage, of a timing mechanism comprising a shiftable power-controlling member normally tending to move in one direction, shiftable means borne by said carriage and adapted to be normally urged into a position wherein it obstructs the movement of the said member in said direction, said member after movement in said direction being adapted to obstruct for a predetermined period the return of the shiftable means to its obstructing position, and means for shifting said obstructing means from its obstructing position.

In testimony whereof I hereunto affix my signature.

WILLIAM MAIER.